US011357075B2

(12) United States Patent
Cai et al.

(10) Patent No.: US 11,357,075 B2
(45) Date of Patent: Jun. 7, 2022

(54) TIMER ADJUSTMENT FOR MOBILE DEVICE

(71) Applicant: Alcatel Lucent USA, Inc., Murray Hill, NJ (US)

(72) Inventors: Yigang Cai, Naperville, IL (US); Yang Yang, Morris Plains, NJ (US)

( * ) Notice: Subject to any disclaimer, the term of this patent is extended or adjusted under 35 U.S.C. 154(b) by 569 days.

(21) Appl. No.: 15/292,689

(22) Filed: Oct. 13, 2016

(65) Prior Publication Data

US 2018/0110087 A1 Apr. 19, 2018

(51) Int. Cl.
*H04W 76/38* (2018.01)
*H04W 76/27* (2018.01)
*H04M 15/00* (2006.01)

(52) U.S. Cl.
CPC ........... *H04W 76/38* (2018.02); *H04M 15/58* (2013.01); *H04M 15/66* (2013.01); *H04W 76/27* (2018.02)

(58) Field of Classification Search
CPC .......................... H04W 76/046; H04W 76/068
See application file for complete search history.

(56) References Cited

U.S. PATENT DOCUMENTS

| | | | | |
|---|---|---|---|---|
| 8,948,106 | B2 * | 2/2015 | Hannu | H04W 76/27 370/329 |
| 2013/0194991 | A1 * | 8/2013 | Vannithamby | H04L 5/0035 370/311 |
| 2015/0029918 | A1 * | 1/2015 | Bangolae | H04W 4/70 370/311 |
| 2015/0172970 | A1 * | 6/2015 | Dai | H04W 36/0072 455/437 |

(Continued)

FOREIGN PATENT DOCUMENTS

| | | | |
|---|---|---|---|
| SE | WO 2015172850 A1 * | 11/2015 | .......... H04W 76/068 |
| WO | WO2018/025091 | 2/2018 | |

OTHER PUBLICATIONS

3GPP TS 36.331 V14.0.0 (Sep. 2016), 3rd. Generation Partnership Project; Technical Specification Group Radio Access Network; Evolved Universal Terrestrial Radio Access (E-UTRA); Radio Resource Control (RRC); Protocol specification (Release 14), pp. 1-636.

(Continued)

*Primary Examiner* — Yaotang Wang
(74) *Attorney, Agent, or Firm* — Capital Patent + Trademark Law Firm, PLLC (57) ABSTRACT

Dynamic control of the length of time that an RRC connection exists is implemented based on the known and anticipated data needs of the UE. More specifically, the lifetime of the RRC connection may be a) initially set, b) extended, or c) shortened, even to the point of substantially immediately releasing it, based on the expected data transmission needs of the UE. This dynamic control is implemented by elements of the core network which are aware of the known and anticipated data needs of the UE. The UE needs are a function of the applications running on the UE. In one LTE-based embodiment, the RRC release timer is responsive to the Policy and Charging Rules Function (PCRF), which can access information about the applications that are running at the UE. In another embodiment, the RRC release timer is responsive to the Policy and Charging Enforcement Function (PCEF).

26 Claims, 3 Drawing Sheets

(56) References Cited

U.S. PATENT DOCUMENTS

| | | | | |
|---|---|---|---|---|
| 2015/0201454 A1* | 7/2015 | Shukair | ................ | H04W 76/25 |
| | | | | 370/329 |
| 2015/0327167 A1* | 11/2015 | Ljung | ................... | H04W 76/38 |
| | | | | 370/311 |
| 2016/0007407 A1* | 1/2016 | Christoffersson | ..... | H04W 76/38 |
| | | | | 370/329 |
| 2017/0150549 A1* | 5/2017 | Olsson | ................ | H04W 76/068 |

OTHER PUBLICATIONS

3GPP TS 29.212 V14.1.0 (Sep. 2016), 3rd. Generation Partnership Project; Technical Specification Group Core Network and Terminals; Policy and Charging Control (PCC); Reference Points (Release 14), pp. 1-263.

3GPP TS 29.210 V6.7.0 (Dec. 2016), 3rd. Generation Partnership Project; Technical Specification Group Core Network and Terminals; Charging Rule Provisioning over GX Interface (Release 6), pp. 1-20.

3GPP TS 23.401 V14.1.0 (Sep. 2016), 3rd. Generation Partnership Project; Technical Specification Group Services and System Aspects; General Packet Radio Service (GPRS) enhancements for Evolved Universal Terrestrial Radio Access Network (E-UTRAN) access (Release 14), pp. 1-373.

3GPP TS 23.203 V14.1.0 (Sep. 2016), 3rd. Generation Partnership Project; Technical Specification Group Services and System Aspects; Policy and Charging Control architecture (Release 14), pp. 1-248.

Sandvine Intelligent Broadband Networks, "Technology Showcase-Traffic Detection Function The Relationship Between Standards, Features and Use Cases".

* cited by examiner

TIMER ADJUSTMENT FOR MOBILE DEVICE

TECHNICAL FIELD

This invention relates to wireless communication, and more particularly, to wireless communications where mobile devices, such as smart phones, are employed.

BACKGROUND OF THE INVENTION

In Long Term Evolution (LTE) network, data flows are carried over a Radio Resource Control (RRC) connection through the evolved, sometimes referred to as enhanced, Node B (eNB). When a User Equipment (UE), e.g., a mobile device, wants to transmit or receive data, it sends an RRC Connection Request to the eNB to establish a RRC connection to carry a data flow. After RRC establishment, the eNB is reserved for a fixed time to carry data from an anticipated near term upcoming data event. A timer is set that determines the RRC connection lifetime. When a timeout of the timer occurs, the RRC connection is released, and the UE enters a state of RRC connection idle, i.e., the UE is put into sleep mode.

Typically, there is a timer for the UE, e.g., an RRC Release timer, upon the expiry of which the UE goes to into sleep mode. Sometimes in the art this timer may be referred to as a sleep timer. This timer is fixed to a value set by the core network. Sometimes a proprietary adaptive RRC release timer is used at the eNB when Evolved Packet Core (EPC) monitors the traffic behavior between the UE and the eNB and develops an algorithm to determine or adjust the RRC release timer in an optimal way, in which case the Mobility Management Entity (MME) will send a traffic behavior to the eNB in a proprietary Information Element (IE) using S1-Application Protocol (AP). The MME's decision is based on traffic management and load balancing, which is determined as a function of actual current traffic load for the UE and actual current overall traffic load. However, in controlling the timer the MME does not consider the data needs of UE, e.g., based on the various applications active at the UE.

More specifically, in the prior art, the UE does not inform the core network about its expected data transmission needs nor does the core network have any control over whether the UE should be put in sleep mode sooner or later. This results in two types of problems. The first problem is that when the UE completes the transmitting or receiving of data in a very short time period, e.g., shorter than was originally expected, the UE is still in a connection mode but it has no data to transmit. The second problem is that the connection will be released once the timer expires and so when the UE has more data to transmit than can be transmitted in the time available before the fixed timer expires, a new connection must be established to transmit the remaining untransmitted data. In both cases, network resources are wasted, which is of concern to network operators and the UE battery life is reduced because of the unnecessary RRC connection and/or need to re-establish the RRC connection.

SUMMARY OF THE INVENTION

We have recognized that, in accordance with the principles of the invention, a dynamic control of the length of time that the RRC connection exists is implemented based on the known and anticipated data needs of the UE. More specifically, the lifetime of the RRC connection may be a) initially set, b) extended, or c) shortened, even to the point of substantially immediately releasing it, based on the expected data transmission needs of the UE. This dynamic control is implemented by elements of the core network which are aware of, or are made aware of, the known and anticipated data needs of the UE. The known and anticipated data needs of the UE are a function of the applications of the UE, e.g., the applications running thereon. More specifically modern UEs, e.g., smart phones, are able to predict upcoming data events, e.g., based on expected upcoming events of the various applications also known as apps, running thereon, and their need for data transmission, to quickly determine upcoming data transmission needs of the UE.

In one LTE-based embodiment of the invention the RRC release timer is responsive to the Policy and Charging Rules Function (PCRF), which can access information about the applications that are running at the UE, and therefore is aware of the data needs of the applications and hence of the UE overall, determines whether the UE RRC release timer should be changed, based on various criteria. The PCRF may supply various criteria to the UE which instruct the UE when and what information to transmit to the PCRF about the various applications and the data needs of the UE. When the conditions are met, the UE sends the requested information. Based on the received information, the PCRF may send a new timer value, which is forwarded to and may be employed by the UE.

In an LTE-based embodiment of the invention the PCRF sends a policy to the Policy and Charging Enforcement Function (PCEF), which implements a timer policy set by the PCRF. Conventionally in LTE, and in various embodiments of the invention, the PCEF is located in the Packet Data Network (PDN) Gateway (PGW or P-GW) and coupled to the PCRF via a Gx interface, e.g., as described in ETSI TS 129 212 V11.6.0 (2012-10), also known as 3GPP TS 29.212 version 11.6.0 Release 11, which is incorporated by reference as if fully set forth herein. However, in other embodiments of the invention, PCEF functionality may be located in the MME, eNB, or Serving Gateway (SGW). In such embodiments of the invention the PCRF may have a Gx interface that couples it to the at least one of the MME, eNB, or Serving Gatway that contains PCEF functionality.

Thus, the PCRF may cause the initially setting and subsequently modification, when necessary, of the value of the RRC release timer or even order the RRC connection to be immediately released regardless of the timer value. More specifically, when it is determined, that data is not needed to be transmitted, the RRC connection, and corresponding radio resources, may be released substantially immediately. In one embodiment of the invention this may be achieved by transmitting a very small value, e.g., a value near zero, to be used as the updated value for the RRC release timer so that the timer essentially immediately expires and the RRC connection is released. In another embodiment of the invention an explicit message may be transmitted to release the RRC connection and essentially RRC release timer becomes irrelevant as any time remaining on it is ignored.

However, when there is an already existing RRC connection and it is detected that additional data has to be transmitted which will take longer than the time of the current expected expiration of the RRC release timer, the lifetime of the RRC release timer may be extended by transmitting an updated value therefor that is greater than its current value. Doing so extends the lifetime of the RRC release timer allowing the UE to transmit, additional, i.e., beyond what would have been possible to transmit with the current RRC release timer value, and preferably all of, the data without requiring release of the RRC connection and then establishment of a new RRC connection.

In another embodiment of the invention, the RRC release timer is similarly responsive to a value determined by the PCEF.

Advantageously, as the RRC connection lifetime better matches the data transmission requirement of the UE, resources are only consumed when really needed. Furthermore, the UE does not engage in wasteful processing and power usage, thus conserving UE battery life.

DETAILED DESCRIPTION

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry or components embodying the principles of the invention. Similarly, it will be appreciated that any flow charts, flow diagrams, state transition diagrams, pseudocode, process descriptions and the like represent various processes which may be substantially represented in computer readable medium and so executed by a computer or processor, whether or not such computer or processor is explicitly shown.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware that is expressly or implicitly shown.

Note that wherever a signal that is transmitted from a transmit antenna is referred to, in systems without antennas such phraseology may be considered to refer to signal supplied to a transmit branch. Similarly, the number of transmit branches may be substituted for the number of transmit antennas.

Likewise, wherever a signal that originates at a receive antenna is referred to, in systems without antennas such phraseology may be considered to refer to a signal arriving at a receive branch. Similarly, the number of receive branches may be substituted for the number of receive antennas.

Unless otherwise explicitly specified herein, the drawings are not drawn to scale.

In the description, identically numbered components within different ones of the FIGS. refer to the same components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "selecting", "assigning", "estimating", "determining", or the like, refer to the action and processes of a computer system, or similar computing device, that manipulates and transforms data represented as physical (electronic) quantities within the computer system's registers and memories into other data similarly represented as physical quantities within the computer system memories or registers or other such information storage, transmission or display devices.

All of the 3GPP documents defining any release of LTE or its predecessors that are publically available as of the date of filing of this application are hereby incorporated by reference as if fully set forth herein.

Figure 1:
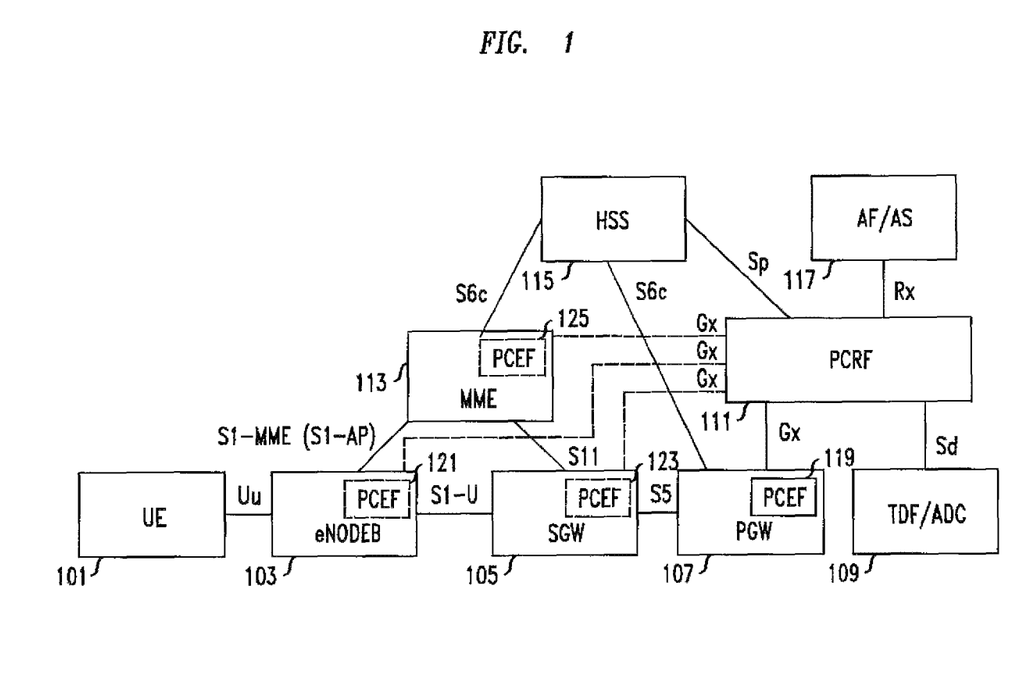
FIG. 1 shows an illustrative portion of a wireless network 100 arranged for implementing the invention.

FIG. 1 shows an illustrative portion of a wireless network 100 arranged for implementing the invention. Network 100 may be a Long Term Evolution (LTE) network. Network 100 includes User Equipment (UE) 101, Evolved Node B (eNodeB) 103, Serving Gateway (SGW) 105, Packet Data Network (PDN) Gateway (PGW) 107, Traffic Detection Function/Application Detection and Control (TDC/ADC) 109, Policy and Charging Rules Function (PCRF) 111, Mobility Management Entity (MME) 113, Home Subscriber Server (HSS) 115, and Application Function/Application Server (AF/AS) 117.

When network 100 is a conventional LTE network, UE 101 and eNodeB are said to make up the Enhanced-Universal Terrestrial Radio Access Network (E-UTRAN). Similarly, Serving Gateway (SGW) 105, Packet Data Network (PDN) Gateway (PGW) 107, Traffic Detection Function/Application Detection and Control (TDC/ADC) 109, Policy and Charging Rules Function (PCRF) 111, Mobility Management Entity (MME) 113, Home Subscriber Server (HSS) 115, and Application Function/Application Server (AF/AS) 117 are said to make up the Core Network (CN), also known as the Evolved Packet Core (EPC). In a conventional LTE network the Policy and Charging Enforcement Function (PCEF) is located within PGW 107 and coupled to PCRF 111 using a Gx interface. However, in accordance with an aspect of the invention, the Policy and Charging Enforcement Function (PCEF) may instead be located within eNodeB 103, SGW 105, or MME 113. These alternative PCEFs are referred to by reference numerals 121, 123, and 125. If such alternative PCEFs are employed, then the one of eNodeB 103, SGW 105, or MME 113 containing the alternative PCEF employed is coupled to PCRF 111 by a Gx interface.

Generally, as is well known, e.g., as set forth in the above noted ETSI TS 129 212 V11.6.0 (2012-10), the Gx interface or protocol, commonly referred to as a reference point, is located between the PCRF and the PCEF. The Gx reference point is used for provisioning and removal of Policy Control and Charging (PCC) rules from the PCRF to the PCEF and the transmission of traffic plane events from the PCEF to the PCRF. The Gx reference point can be used for charging control, policy control or both by applying AttributeValue Pairs (AVPs) relevant to the application. The Gx reference point can also be used for application's traffic detection and control.

In the illustrative embodiment shown in FIG. 1, e.g., in accordance with LTE, UE 101 is coupled to eNodeB 103 via an air interface, e.g., the LTE uU interface. In LTE, eNodeB 101 is coupled to MME 113, e.g., via an S1-MME, also known as S1-AP, interface and to SGW 105, e.g., via an S1-U interface. SGW 105 is coupled to PGW 107, e.g., via an S5 interface. PGW 107 is coupled to PCRF 111, e.g., via a Gx interface. PCRF 111 is also coupled to TDF/ADC 109, e.g., via an Sd interface, to HSS 115, e.g., via an Sp interface, and to AF/AS, e.g., via an Rx interface. Note that in other embodiments of the invention, TDF/ADC 109 may be incorporated as part of PGW 119. HSS 115 is coupled to MME 113, e.g., via an S6a interface, and may also optionally be coupled, e.g., in some embodiments, to PGW 107, e.g, via an S6b interface.

AF/AS 117 provides application data relevant to UE behavior to PCRF 111, in the usual manner. ADC/TDF 109 collects traffic information, e.g., traffic load, from the IP Connectivity Access Network (IP-CAN) (not shown) in the conventional manner and provides it to PCRF 111.

In accordance with an aspect of the invention, PCRF 111, which is different from a conventional prior art PCRF, is a policy maker which determines whether an RRC release timer for a UE should be changed based on various criteria. For example, in one embodiment of the invention, PCRF 111 sets the RRC release timer value. More specifically, PCRF 111 runs its rules engine based on the information it has from various sources about the data needs of UE 101 and sets an appropriate RRC release timer value. This value is then forward to PCEF 119 and eventually on to UE 101.

In another embodiment of the invention, the PCEF, which may be any of PCEF 119, PCEF 121, PCEF 123, or PCEF 125, interfaces with PCRF 111 to receive therefrom rules, which may also be referred to as policies and/or criteria. Indeed, conventionally, PCRF 111 provides Policy Control and Charging (PCC) rules to the PCEF via the Gx interface. When PCEF 119 receives information about the needs of UE 101, PCEF 119 compares the information about the data against the rules received from PCRF 111 and develop, based thereon, a new value for the RRC release timer, when the rules indicate it is appropriate to do so. PCEF 119 forwards the determined new RRC release timer to eNB 103 for RRC Connection state changes to be implemented by UE 101, or PCEF 119 transmits the suggestion of RRC Connection state changes to eNB 103 and eNB 103 determines an RRC release timer based on the supplied suggestion, which is then supplied to UE 101.

In one embodiment of the invention, PCRF 111 may be configured with rules that specify which one or more of the network elements (NEs) connected to it, e.g., AF/AS, 117, HSS 115, TDF/ADC 109, and PGW 107, as well as potentially, MME 113, eNodeB 103, and SGW 105, play the role in the collection information regarding the value employed for the RRC release timer. As such, PCRF 111 may solicit one or more of the NEs to supply it with data, e.g., by using a solicit request, such as Gx CCA message, e.g., employing enhanced new AttributeValue Pairs (AVPs), such as are described hereinbelow. Such new AVPs may include the RRC Release timer, monitoring entity, the measures or information to be collected, criteria for decision making, etc. such as service provider input, UE type and service required, UE battery level indication, AS service required, network traffic congestion and modes, application delay tolerance, and handover and mobility scenarios.

The responses from the NEs are supplied via Gx CCR messages, which may also employ new AVPs as described hereinbelow. In particular, depending on implementation, UE 101, eNodeB 103, ADC/TDF 115, and AF/AS 117 may provide the information. UE 101 may also inform eNodeB 103 of its activity status/forecast which is then transmitted to PCRF 111, e.g., via a background signaling exchanges.

The core network Policy and Charging Control (PCC) architecture, e.g., as described, for example, in 3GPP TS 23.203 V13.7.0 (2016-03), may also be further enhanced to detect from service data flow by TDF/ADC 117 to obtain the information needed to evaluate the data transmission needs of UE 101. TDF 115 may be a standalone unit or it may be integrated with PCEF 119.

AF/AS 117, which supports the application usage of the UEs, can also predict time, usage of data, and volume of transmission data that UE actually uses update PCRF 111 with the needed data.

The criteria based on which a value of the RRC release timer is initially set or changed may include, but is not limited to, the following: 1) service provider scheduled, 2) UE type and service required, 3) UE battery level indication, 4) AS service required, 5) network traffic congestion and modes, 6) application delay tolerance, and 7) handover and mobility scenarios.

Figure 2:
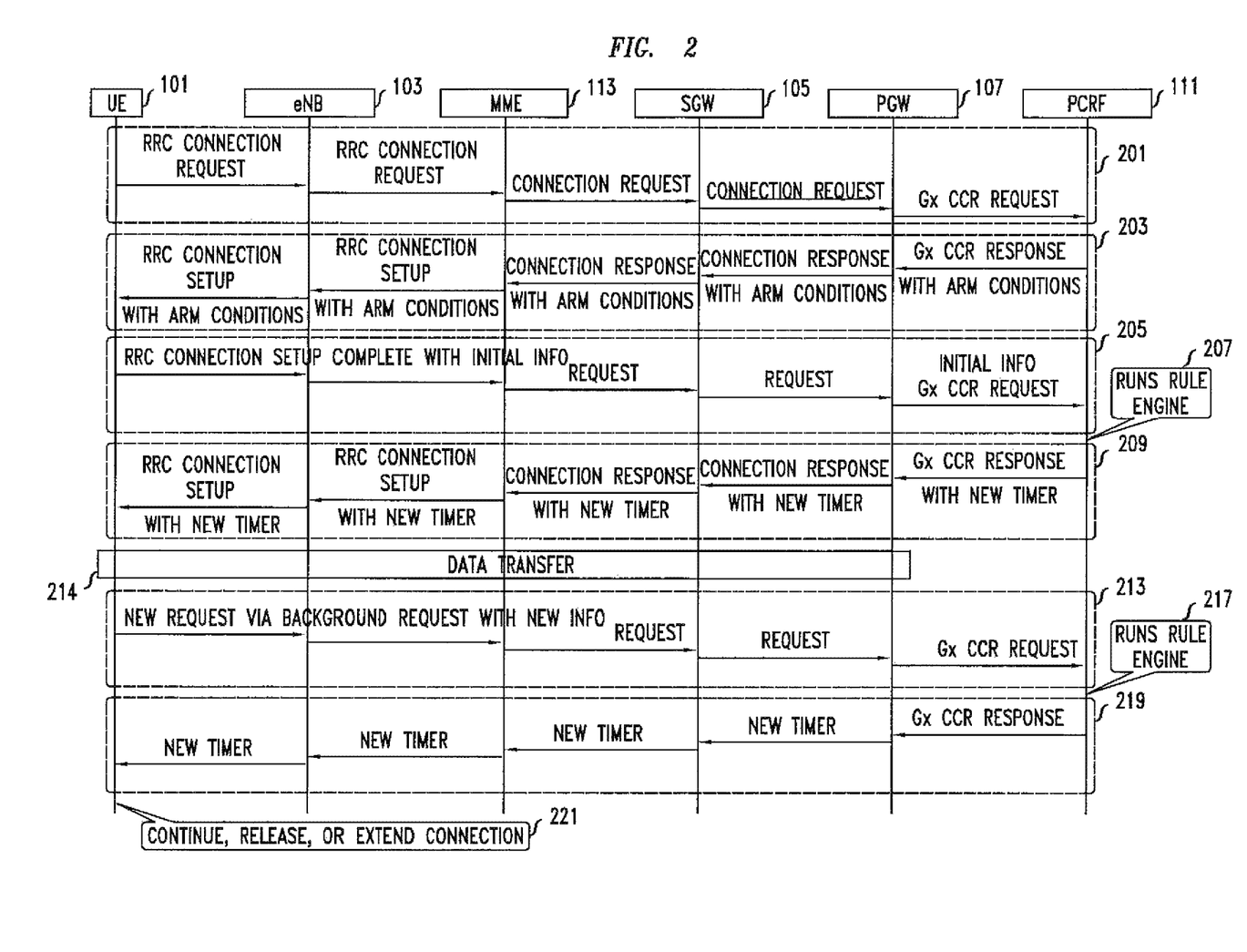
FIG. 2 shows an illustrative protocol flow diagram of signaling messages for setting up a connection for a UE with an initial RRC timer value and for changing the RRC timer value when appropriate to do so, for an illustrative embodiment of the invention.

FIG. 2 shows an illustrative protocol flow diagram of signaling messages for setting up a connection for a UE with an initial RRC timer value and for changing the RRC timer value when appropriate to do so, for an illustrative embodiment of the invention. FIG. 2 shows columns for each of UE 101, eNodeB (eNB) 103, MME 113, SGW 105, PGW 107, and PCRF 111. Other than data transfer, messages originating with UE 101 and are passed along a chain of eNodeB (eNB) 103, MME 113, SGW 105, and PGW 107, and are then terminated at PCRF 111. Similarly, messages originating with PCRF 111 are passed along a chain of PGW 107, SGW 105, MME 113, and eNodeB (eNB) 103 and are terminated at UE 101. Arrows indicate the direction in which a message of the protocol is transmitted. Because many of the messages are simply forward from one element to the next in the chain, for purposes of brevity and simplicity each chain of messages is treated together, When a message changes its name or is otherwise processed, as opposed to simply being forwarded, it may be discussed separately hereinbelow. Also, note that data transfer takes place only between UE 101 and PGW 107 and that the data itself is not supplied to PCRF 111. As such, PCRF 111 must obtain information about the data flow indirectly, i.e., from other sources.

Message chain 201 reflects an RRC connection request by the UE, which transmits an initial RRC Connection Request message which is propagated along the chain until MME 113, in which case the RRC Connection Request is passed further simply as a Connection Request to SGW 105. Upon receipt at PGW 107, the request is converted to a Credit Control Request Message (CCR Request) and propagated over the Gx interface between the PCEF in PGW 107 and PCRF 111.

In message chain 203, in response to the received Gx CCR Request, PCRF 111 returns to the PCEF in PGW 107 a Credit Control Answer (CCA) message to the PCEF in PGW 107 over the Gx interface. The returned Gx CCA Response contains arm conditions which are triggering conditions. In this case, the trigger conditions are conditions that when met cause an NE to which it is targeted to transmit information to PCRF 111, which can then use that information to make a decision regarding the RRC release timer value. The particular NE to which an arm condition is targeted takes its arm condition to be acted on as appropriate and transmits the remaining arm conditions to the next NE, where UE 101 may also be an NE.

To this end, the Gx CCA Response is converted by PGW 107 to a Connection Response message containing the arm conditions which is forwarded to MME 113. MME 113 converts the Connection Response message and arm conditions it receives to an RRC Connection Setup message, which is forwarded to eNB 103. eNB 103 forwards the RRC Connection Setup message along with the remaining arm conditions to UE 101. Note that in some embodiments of the invention, where the messages contain arm conditions that are for use by only one of the elements through which the message chain passes, those conditions need not be further forward beyond the element to which they are targeted.

As indicated by message chain 205, UE 101 responds to the RRC Connection Setup message with an RRC Connection Setup Complete message to eNB 103 and also provides thereto initial information about the anticipated data needs of the UE responsive to the arm conditions that were received. The message and information are forwarded by eNB 103 to MME 113. In response, MME 113 forwards a Request message to SGW 105 which propagates it to PGW 107, e.g., to PCEF therein. This is then converted to a Gx CCR Request which is sent to PCRF 111. Thus the initial information reaches PCRF 111.

In response to this Gx CCR Request and the initial information, PCRF 111 runs its rules engine at point 207 to determine an initial RRC release timer value, based on the information received from the UE, in accordance with an aspect of the invention. The initial timer value determined by the rules engine of PCRF 111 is transmitted in message chain 209 in a Gx CCA Response message to the PCEF within PGW 107, in accordance with an aspect of the invention.

The Gx CCA Response including the RRC Release timer value is converted by PGW 107 to a Connection Response message which is forwarded to MME 113. MME 113 converts the Connection Response message it receives to an RRC Connection Setup message, which is forwarded to eNB 103, along with the initial RRC Connection timer value. eNB 103 forwards the RRC Connection Setup message along with the initial RRC Connection timer value to UE 101, which sets its timer to employ the received initial RRC Release timer value.

Thereafter, data transfer proceeds along chain 211 in the usual manner so long as the RRC Connection timer which was set with the initial value has not expired.

A new request, which is transmitted using, for example, previously unused fields of the so-called via background requests, e.g., previously reserved fields in existing messages of the protocol, with new or updated information about the anticipated data transmission needs of UE 101 is transmitted by UE 101 to eNB 103 in chain 213. The message and new information are forwarded by eNB 103 to MME 113. In response, MME 113 forwards a Request message to SGW 105 which propagates it to PGW 107, e.g., to PCEF therein. This is then converted to a Gx CCR Request which is sent to PCRF 111.

In response, PCRF 111 runs its rules engine at point 217 to determine if the current timer value is satisfactory or if it needs to be modified based on the new information received from UE 101, in accordance with an aspect of the invention. In the event the rules engine determines that the timer is satisfactory, the PCRF sends a "new" timer value, which is actually the same as the old value thus instructing UE 101 to continue its prior behavior, between UE 101 and PGW 107. Note that conventionally each such message contains a time stamp which allows the UE to set the RRC Release timer to the same value it already has. Consequently, data transfer continues in the usual manner in data transfer 211. In the event that the rules engine of PCRF 111 determines that a new timer value should be employed, whether an increase or a decrease in the timer value, PCRF 111 transmits in message chain 219 a Gx CCA Response message to the PCEF within PGW 107 with the new value for the RRC Release timer, in accordance with an aspect of the invention. This causes UE 101 to use a different timer value than the one it was already employing.

The Gx CCA Response including the new timer value is converted by PGW 107 to a Connection Response message which is forwarded to MME 113. MME 113 converts the Connection Response message it receives to an RRC Connection Setup message including the new timer value, which is forwarded to eNB 103. eNB 103 forwards the RRC Connection Setup message along with the new timer value to UE 101, which modifies the timer to employ the newly received timer value at point 221. The effect at UE 101 is to continue, release or extend the RRC connection.

Data transfer proceeds along chain 211 in the usual manner after setting of the new RRC Release timer value so long as the RRC Release timer which was set with the new value has not expired.

In some embodiments of the invention, UE 101 may decide it doesn't like the new timer value and can ask again for a different new timer value. For example, the new timer may not meet the conditions as existing at the UE. This could result for various reasons, e.g., again at UE 101 the conditions have changed or there could be an error or conflict in the PCRF rules resulting in an undesired value. Thus, a form of negotiation of the RRC Release timer will be performed between UE 101 and the PCRF 111. Alternatively, eNB 103 may perform the negotiation with PCRF 111.

In support of the embodiment of FIG. 2, when implemented in an LTE-based embodiment, the Gx protocol, e.g., the Diameter Gx reference point as described in TS 29.212 and 29.210, may be reused to carry timer rules and the new timer value for the UE RRC Release timer through one of NEs in the core network, e.g., MME 113, SGW 105, PGW 107.

To this end, various ones of the Gx messages may be modified to carry the required information. To this end, the modified Gx messages shown below include additional information, e.g., AVPs which are indicated in bold.

The Credit Control Request (CCR) command, indicated by the Command-Code field set to 272 and the 'R' bit set in the Command Flags field, is sent by PCEF 119 to PCRF 111 in order to request timer rules for a new timer for a bearer, i.e., a particular stream of data going to or from UE 101. The message format is as follows:

```
<CC-Request> ::=      < Diameter Header: 272, REQ, PXY >
                      < Session-Id >
                      { Auth-Application-Id }
                      { Origin-Host }
                      { Origin-Realm }
                      { Destination-Realm }
                      { CC-Request-Type } [Timer Condition]
                      { CC-Request-Number }
                      [ Destination-Host ]
                      [ Origin-State-Id ]
                     *[ Subscription-Id ]
                      [ Framed-IP-Address ]
                      [ Framed-IPv6-Prefix ]
                      [ 3GPP-RAT-Type ]
                      [ Termination-Cause ]
                      [ User-Equipment-Info ]
```

```
                      [ 3GPP-GPRS-Negotiated-QoS-Profile ]
                      [ 3GPP-SGSN-MCC-MNC ]
                      [ 3GPP-SGSN-Address ]
                      [ 3GPP-SGSN-IPv6-Address ]
                      [ Called-Station-ID ]
                      [ Bearer-Usage ]
                      [ PDP-Session-Operation ]
                     *[ Timer-Rule-Request ]
                     *[ Timer-Conditions-Results ]
                     *[ TFT-Packet-Filter-Information ]
                     *[ Proxy-Info ]
                     *[ Route-Record ]
                     *[ AVP ]
```

The Credit Control Answer (CCA) command, indicated by the Command-Code field set to 272 and the 'R' bit cleared in the Command Flags field, is sent by PCRF 111 to the PCEF 119 in response to the CCR command. It is used to provision timer rules and event triggers for a bearer. The message format is as follows:

```
<CC-Answer> ::=       < Diameter Header: 272, PXY >
                      < Session-Id >
                      { Auth-Application-Id }
                      { Origin-Host }
                      { Origin-Realm }
                      [ Result-Code ]
                      [ Experimental-Result ]
                      { CC-Request-Type }
                      { CC-Request-Number }
                     *[ Event-Trigger ]
                      [ Origin-State-Id ]
                     *[ Charging-Rule-Remove ]
                     *[ Charging-Rule-Install ]
                      [ Charging-Information ]
                     *[ Timer-Condition-Criteria ]
                      [ Timer]
                      [ Error-Message ]
                      [ Error-Reporting-Host ]
                     *[ Failed-AVP ]
                     *[ Proxy-Info ]
                     *[ Route-Record ]
                     *[ AVP ]
```

Figure 3:
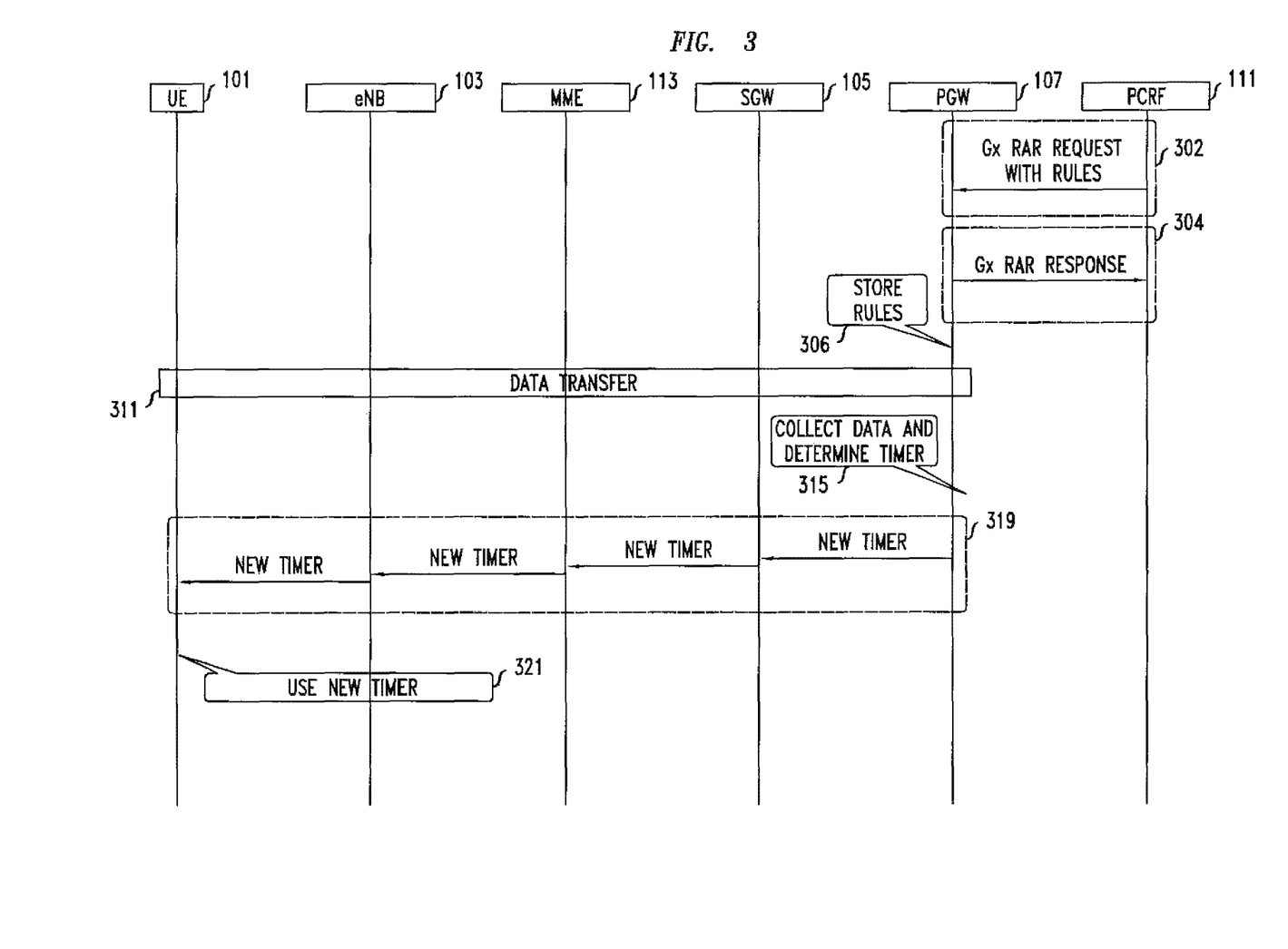
FIG. 3 shows an illustrative protocol flow diagram of signaling messages for another embodiment of the invention.

FIG. 3 shows a simplified illustrative protocol flow diagram of signaling messages for another embodiment of the invention in which PCEF 119 in PGW 107 guides the process and determines the new timer value. Note that this scenario can happen before the connection is established or in the middle of data transfer. Those basic messages for setting up the connection and establishing the initial connection that are conventional or already shown in FIG. 2 are not repeated in FIG. 3. To this end PCRF 111 is configured with rules determining the RRC Release timer. To this end, PCRF 111 collects information from various ones of the network elements, e.g., AF/AS 117, HSS 115, and PCEF 119, which is not shown but is similar to the use of arm conditions as shown in FIG. 2 Thereafter, PCRF 111 transmits in message chain 302 a Gx Re-Auth-Request (RAR) command to PCEF 119 within PGW 107 to proactively download RRC Timer rules to the PCEF, thus proactively downloading the RRC Timer policy to PCEF 119. In response, PCEF 119 within PGW 107 transmits a Re-Auth-Answer (RAA) message to PCRF 111 in message chain 304 and also stores the rules as indicated by action 306.

While data transfer proceeds in message chain 311, at action point 315 PCEF 119 collects information gathered by eNB 103 and TDF/ADC 109 and runs the policy with using the collected information by applying the rules to the collected information to determine whether there is a need to update the RRC release timer.

If PCEF 119 determines that there is indeed a need to update the RRC Release timer, based on the collected information and the rules, PCEF 119 transmits a new RRC Release timer value to eNB 103. eNB 103 transmits the new RRC release timer value to UE 101 to have the UE release or extend the RRC connection.

As explained in connection with FIG. 2, in some embodiments of the invention, UE 101 may decide it doesn't like the new timer value and can ask again for a different new timer value. For example, the new timer may not meet the conditions as existing at the UE. This could result for various reasons, e.g., again at UE 101 the conditions have changed or there could be an error or conflict in the rules used by PCEF 119 resulting in an undesired value. Thus, a form of negotiation of the RRC Release timer will be performed between UE 101 and PCEF 119. Alternatively, eNB 103 may perform the negotiation with PCEF 119.

Again, various ones of the Gx messages may be modified to carry the required information. To this end, the modified Gx messages shown below include additional information, e.g., AVPs which are indicated in bold.

The RAR command, indicated by the Command-Code field set to 258 and the 'R' bit set in the Command Flags field, is sent by PCRF 111 to PCEF 119 in order to initiate the provisioning of unsolicited rules for an existing bearer. The message format is as follows:

```
<RA-Request> ::=    < Diameter Header: 258, REQ, PXY >
                    < Session-Id >
                    { Auth-Application-Id }
                    { Origin-Host }
                    { Origin-Realm }
                    { Destination-Realm }
                    { Destination-Host }
                    { Re-Auth-Request-Type } [Timer Condition]
                    *[ Timer-Condition-Criteria ]
                    [ Timer]
                    [ Origin-State-Id ]
                    *[ Proxy-Info ]
                    *[ Route-Record ]
                    *[ AVP]
```

The Re-Auth-Answer (RAA) command, indicated by the Command-Code field set to 258 and the 'R' bit cleared in the Command Flags field, is sent by PCEF 119 to PCRF 111 in response to the RAR command. The message format is as follows:

```
<RA-Answer> ::=     < Diameter Header: 258, PXY >
                    < Session-Id >
                    { Origin-Host }
                    { Origin-Realm }
                    [ Result-Code ]
                    [ Experimental-Result ]
                    *[ Timer-Condition-Results ]
                    [ Origin-State-Id ]
                    [ Error-Message ]
                    [ Error-Reporting-Host ]
                    *[ Failed-AVP ]
                    *[ Proxy-Info ]
                    *[ AVP ]
```

Note that wherever herein the PCEF is referred to as PCEF 119, in other embodiments where the PCEF may be implemented in other network elements than PGW 107, e.g., as PCEF 121 in eNodeB 103, PCEF 123 in SGW 105, or PCEF 125 in MME 113, such other PCEFs may be substituted for PECF 119.

What is claimed is:

1. A method for controlling the existence of a Radio Resource Control (RRC) connection, the method comprising:
    receiving a plurality of reports, at least one of the reports indicating anticipated data usage at a respective user equipment (UE); and
    causing transmission of a plurality of commands towards the UE, each command modifying a timer value of a RRC release timer in the UE that defines a current set remaining lifetime of the RRC connection resulting in a modified remaining lifetime for the RRC connection, at least one of the commands modifying a RRC release timer value effectively causing extension of the lifetime of an existing RRC connection when it is determined based on a report from at least the UE that anticipated data usage by the UE is that the UE will have data to transmit that will take longer to transmit than can be accomplished prior to a current slated expiry of a current value of a RRC release timer.

2. The invention as in claim 1 where at least one command of the plurality of commands specifies an updated value for a RRC release timer of the UE which already has a current RRC release timer value.

3. The invention as in claim 2 wherein the updated value is greater than the current value of the RRC release timer.

4. The invention as in claim 2 wherein the updated value is smaller than the current value of the RRC release timer.

5. The invention as in claim 2 wherein the updated value is essentially zero.

6. The invention as in claim 1 wherein the method is for use with a Long Term Evolution (LTE) system.

7. The invention as in claim 1 wherein a modified timer value of one of the plurality of commands indicates a lifetime greater than a currently set lifetime.

8. The invention as in claim 1 wherein a modified timer value of one of the plurality of commands indicates a lifetime smaller than a currently set lifetime.

9. The invention as in claim 1 wherein the modified value is set responsive to a Policy and Charging Rules Function (PCRF) which is aware of the anticipated data usage by the UE.

10. The invention as in claim 1 wherein at least one command of the plurality of commands releases a RRC connection regardless of the value of the RRC timer when it is determined that the anticipated data usage by the UE is that the UE presently has no need to transmit data.

11. The invention as in claim 1 wherein the UE has an existing RRC connection that is slated to be released upon expiration of the current value of the Radio Resource Control (RRC) release timer value.

12. The invention as in claim 1 further wherein the UE is a smart phone and the anticipated data usage by the UE is determined based on the report from the smart phone.

13. The invention as in claim 12 wherein said report includes information about applications active on the smart phone.

14. The invention as in claim 12 wherein said report is transmitted when criterion specified by a Policy and Charging Rules Function (PCRF) are determined by the UE to have been met.

15. The invention as in claim 12 wherein said report is transmitted to a Policy and Charging Rules Function (PCRF) which causes the transmission of the at least one command towards the UE to modify the timer value in response thereto when a criterion specified in the PCRF for doing so is met.

16. A core network for controlling the existences of a Radio Resource Control (RRC) connection after the RRC connection is established and an initial RRC Release timer is set but prior to expiration of the RRC Release timer, the network comprising one or more devices adapted to complete:
- a Policy and Charging Rules Function (PCRF); and
- a Policy and Charging Enforcement Function (PCEF);
- wherein the PCRF and PCEF are coupled by a Gx interface; and
- wherein the PCEF transmits a plurality of commands towards a user equipment (UE), each command modifying a timer value of a RRC release timer in the UE that defines a currently set remaining lifetime of the RRC connection resulting in a modified remaining lifetime for the RRC connection, at least one of the commands modifying a RRC release timer value effectively causing extension of the lifetime of an existing RRC connection when it is determined based on a report from at least the UE that anticipated data usage by the UE is that the UE will have data to transmit that will take longer to transit than can be accomplished prior to a current slated expiry of a current value of a RRC release timer.

17. The invention as in claim 16 wherein the PCRF is configured to determine each of the modified timer values and the PCRF is further configured to transmit each of the modified timer values to the PCEF.

18. The invention as in claim 16 wherein the PCEF is configured to determine each of the modified timer values.

19. The invention as in claim 16 wherein the PCRF receives information about UE anticipated data usage from the PCEF.

20. The invention as in claim 16 wherein the PCEF receives rules from the PDRF based on which a new timer value is determined by the PCEF in conjunction with information about UE anticipated data usage.

21. The invention as in claim 16 wherein the core network further comprises one or more user equipment (UE), each UE adapted to:
- transmit a plurality of reports, at least one of the reports indicating anticipated data usage at the respective UE, and
- receive a plurality of modified timer values for its Radio Resource Control (RRC) connection Release Timer that is based on the transmitted reports,
- wherein, based on the at least one report, at least one of the modified timer values effectively causes extension of the lifetime of an existing RRC connection when it is determined that the respective UE will have data to transmit that will take longer to transmit than can be accomplished prior to a current slated expiry of a current value of a RRC release timer.

22. The invention as in claim 21 wherein one of the one or more devices is adapted to originate the modified timer value in a Policy and Charging Enforcement section, the device being coupled to an eNodeB with which the UE is communicating.

23. The invention as in claim 21 wherein one of the one or more devices is adapted to originate the modified timer value in a Policy and Charging Rules section, the device being coupled to an eNodeB with which the UE is communicating.

24. A user equipment (UE) adapted to transmit a plurality of reports, at least one of the reports indicating anticipated data usage at the UE, and the UE is further adapted to receive a plurality of modified timer values for its Radio Resource Control (RRC) connection Release Timer that is based on the transmitted reports, wherein at least one of the modified timer values effectively causes extension of the lifetime of an existing RRC connection when it is determined that the UE will have data to transmit that will take longer to transmit than can be accomplished prior to a current slated expiry of a current value of a RRC release timer based on the at least one report.

25. The invention as in claim 24 wherein the modified timer values originate in a Policy and Charging Rules Function (PCRF) that is coupled to an eNodeB with which the UE is communicating.

26. The invention as in claim 24 wherein the modified timer values originate in a Policy and Charging Enforcement Function (PCEF) that is coupled to an eNodeB with which the UE is communicating.

* * * * *